United States Patent

[11] 3,543,873

| [72] | Inventor | William W. Toy |
| | | Bloomfield Hills, Michigan |
| [21] | Appl. No. | 714,268 |
| [22] | Filed | March 19, 1968 |
| [45] | Patented | Dec. 1, 1970 |
| [73] | Assignee | Lewis G. Harmon |
| | | Birmingham, Michigan |
| | | a part interest |

[54] TURBINE AND ELECTRIC POWERED VEHICLE
36 Claims, 4 Drawing Figs.

[52] U.S. Cl............................................. 180/65,
60/12, 60/62, 180/66, 290/19, 290/25
[51] Int. Cl. ................................................. B60k 1/04,
B60k 17/10
[50] Field of Search........................................ 180/66, 67,
65; 60/54, 62, 57, 6, 12, 39.18(C); 290/19, 25

[56] References Cited
UNITED STATES PATENTS

| 913,846 | 3/1909 | Pieper............................ | 290/19 |
| 1,303,870 | 5/1919 | Fend.............................. | 180/65UX |
| 2,107,844 | 2/1938 | Abbott........................... | 290/25 |
| 2,137,139 | 11/1938 | Keller............................ | 60/62 |
| 2,336,052 | 12/1943 | Anderson et al............... | 180/66(A)UX |
| 2,697,492 | 12/1954 | Destival......................... | 180/66(A) |
| 3,314,232 | 4/1967 | Hill................................ | 60/12X |
| 1,323,500 | 12/1919 | Stephenson ................... | 180/65(A)UX |

FOREIGN PATENTS

| 628,201 | 8/1949 | Great Britain................ | 180/66(A) |

*Primary Examiner*—Benjamin Hersh
*Assistant Examiner*—Milton L. Smith
*Attorney*—Hauke, Gifford & Patalidis

ABSTRACT: A combined turbine and electric drive for a vehicle which includes a turbine, an aerodynamic torque converter driven by the turbine, and a motor generator connected to a source of electrical energy and having a rotor connected to the aerodynamic torque converter and the vehicle wheels. The vehicle is driven by the turbine or is driven electrically by the motor generator in the motor mode or simultaneously by both and includes automatic switching means to disconnect the energy source from the motor generator under certain conditions.

Patented Dec. 1, 1970

INVENTOR.
WILLIAM W. TOY
BY
Barnes, Kisselle, Raisch & Choate
ATTORNEYS

INVENTOR.
WILLIAM W. TOY
BY
Barnes, Kisselle, Raisch & Choate
ATTORNEYS 3,543,873

TURBINE AND ELECTRIC POWERED VEHICLE

This invention relates to vehicles and particularly to a new drive system and associated controls for vehicles.

The basic problems with using turbine engines for vehicular power plants are threefold. First, fuel economy at part power operating ranges is quite poor. Secondly, response rates compared to piston engines are too low for desirable speed changes and acceleration capabilities. Third, turbines have completely different output torque characteristics in comparison with piston power plants.

In using of torque converters with turbines as a means of transmitting power to the vehicle drive wheels, it must be recognized that output characteristics are based on torque-speed curves which inherently include a time delay that cannot be tolerated. In the present invention, a motor generator is incorporated to provide the instantaneous power for starting up and for initial acceleration to mask the turbine power problem and to better enable the turbine to unload rapidly when needed for fast speed changes.

Turbines are very inefficient in heavy traffic, and the quantity of fuel which is wasted contributes greatly to pollution problems. With the present system, the turbine may be shut down at such times and the vehicle operated solely by the motor generator.

Among the objects of the invention are to provide a combined turbine engine and electric drive for a vehicle wherein the electric drive can be utilized to add its output to that of the turbine for maximum performance at startup and low speeds, or may be used alone when the turbine is inoperative and the turbine drive can be utilized by itself for maximum performance at higher speeds or at times when its inherent time delay characteristic is not effective; which system utilizes a motor generator that is used to drive the vehicle electrically or to charge the energy source when the vehicle is driven by the turbine; which utilizes a novel system for either manually or automatically controlling the operation of the turbine and the motor generator, including a condition responsive switching circuit to disconnect the energy source from the motor generator; which provides a power plant with low exhaust pollutant emission when operated primarily as a turbine and zero pollution when operated electrically in congested areas; which provides an electric vehicle with extended range capability due to the recharging of the battery by operation of the turbine; and which can also be used as a source of electric power for drive assist and other purposes.

DESCRIPTION OF THE PREFERRED EMBODIMENT

Figure 1:
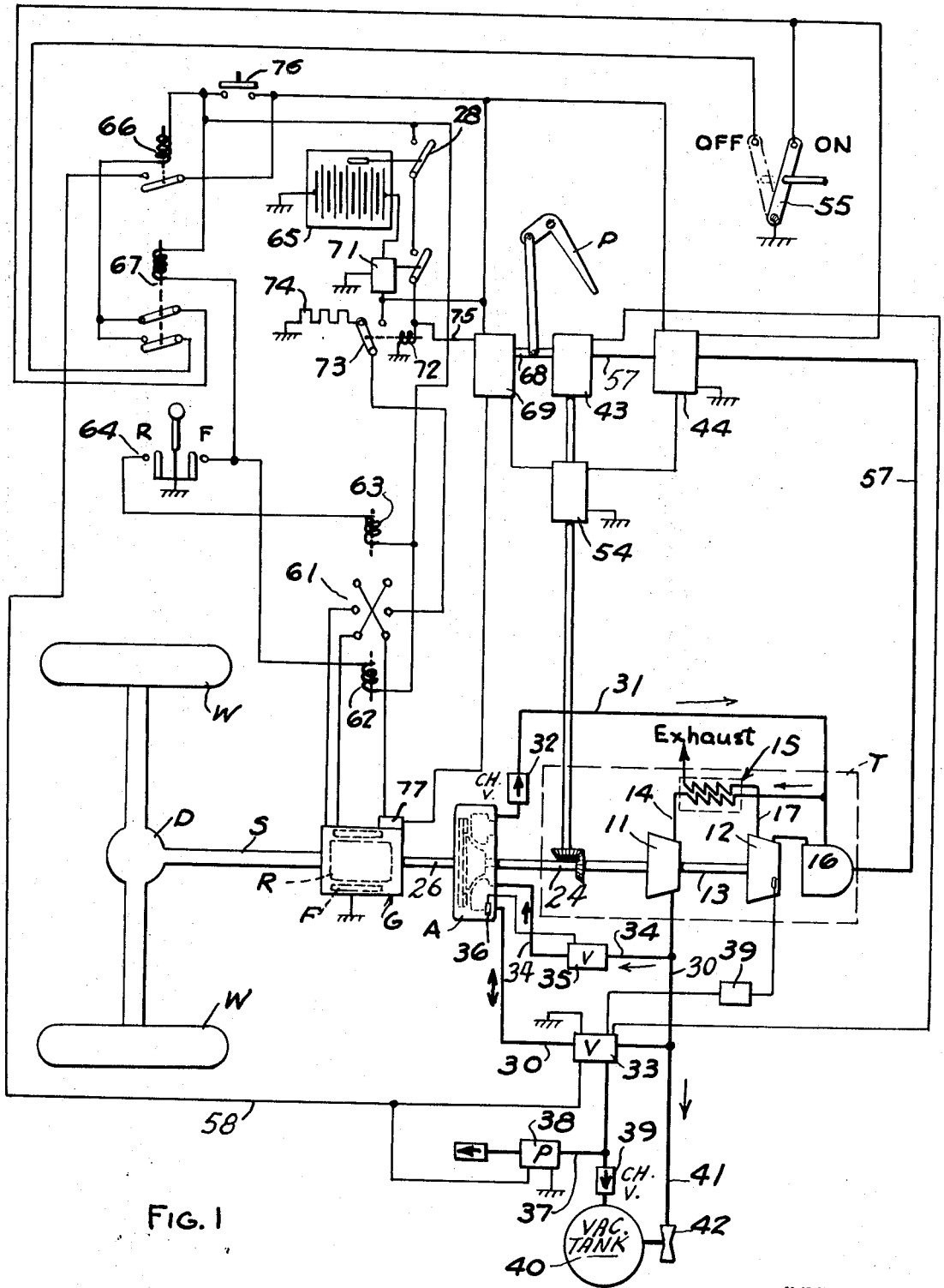
FIG. 1 is a part sectional diagrammatic view of a gas turbine and electric vehicle embodying the invention.

Referring to FIG. 1, the improved system embodying the invention, more generally described, comprises a turbine T which drives an aerodynamic torque converter A which, in turn, drives a motor generator G the rotor R of which drives a drive shaft S extending to an axle drive D for driving the driven wheels W of a vehicle (not shown).

The motor generator G is of the traction motor type, such as a series wound electric motor generator, and comprises a stator F and a rotor R, the rotor being directly connected to the aerodynamic torque converter as presently described and to the drive shaft S.

Still referring to FIG. 1, turbine T comprises a conventional single shaft turbine which includes a compressor 11 and a turbine 12 that preferably have their rotors directly connected as by a single shaft 13. A portion of the compressed air from the compressor 11 flows through a line 14 and through a heat exchanger 15 into the combustor 16 of the turbine. The exhaust gases from the turbine flow by means of a line 17 adjacent line 14 through the heat exchanger 15.

Figure 3:
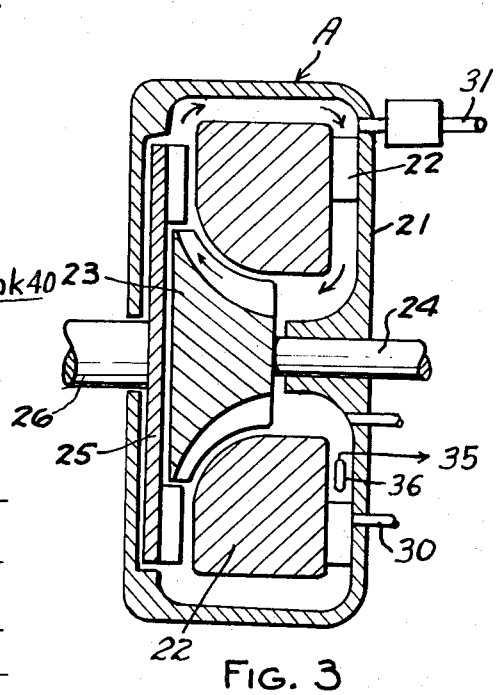
FIG. 3 is a sectional view through a preferred aerodynamic torque converter which may be embodied in the system shown in FIG. 1.

As shown in FIG. 3, the aerodynamic torque converter A has a casing 21 with fixed guide vanes 22 and a rotor 23 that is connected by a shaft 24 to the shaft 13 by means of the compressor 11. The casing 21 is adapted to be filled with compressible fluid, namely, air, from the compressor so that upon rotation of the rotor 23, the flow of air exerts a torque which is provided to rotate an output rotor 25 which is drivingly connected to the output shaft 26 of the torque converter that is connected to the drive shaft of rotor R of the motor generator G. For purposes of clarity, the torque converter has been shown as a single stage turbine having one output rotor 25 but it may comprise a multiple stage turbine. As shown, the torque converter is preferably of the outward radial flow turbine type, however, an axial flow design may also be used.

As further shown in FIG. 1, a first fluid line 30 extends from the discharge point of compressor 11 to the casing 21 of the torque converter A. A second fluid line 31 extends from a point on the casing 21 of the torque converter A to the turbine and specifically beyond compressor 11 for connection to the combustor 16 of the turbine. A one-way check valve 32 is provided in the line 31 so that flow can occur in the line 31 only from the casing 21 of the torque connecter to the turbine.

A valve 33 is provided in the line 30 and is operable to permit flow through line 30 from the compressor 11 to the casing 21 to divert the flow from the line 30 and permit fluid to drain from the casing 21 outwardly through the valve 33. A line 34 is connected to the discharge point of compressor 11 by means of line 30 for communication with the casing 21 and a valve 35 is interposed in the line 34 which is responsive to a temperature sensitive element 36 in the casing 21 to permit flow from the compressor to the casing when the temperature in the casing exceeds a predetermined value.

As further illustrated in FIG. 1, a line 37 extends from the valve 33 to a vacuum pump 38 which is the starting position of the system, as presently described. The valve 33 is also connected through a one-way check valve 39 to a vacuum tank 40. The subatmospheric pressure in the vacuum tank 40 is maintained by a line 41 which is a continuation of line 30 extending from the compressor 11 which provides a continuous flow through a venturi 42 that continuously works to aspirate air from the tank 40.

The turbine T further includes a manually controlled turbine engine governor and fuel control 43 operated by a foot pedal P that is operable to vary the fuel supply to the turbine T by means of a line 57 and through a starting sequence control 44 to the combustor 16 of the turbine.

Figure 2:
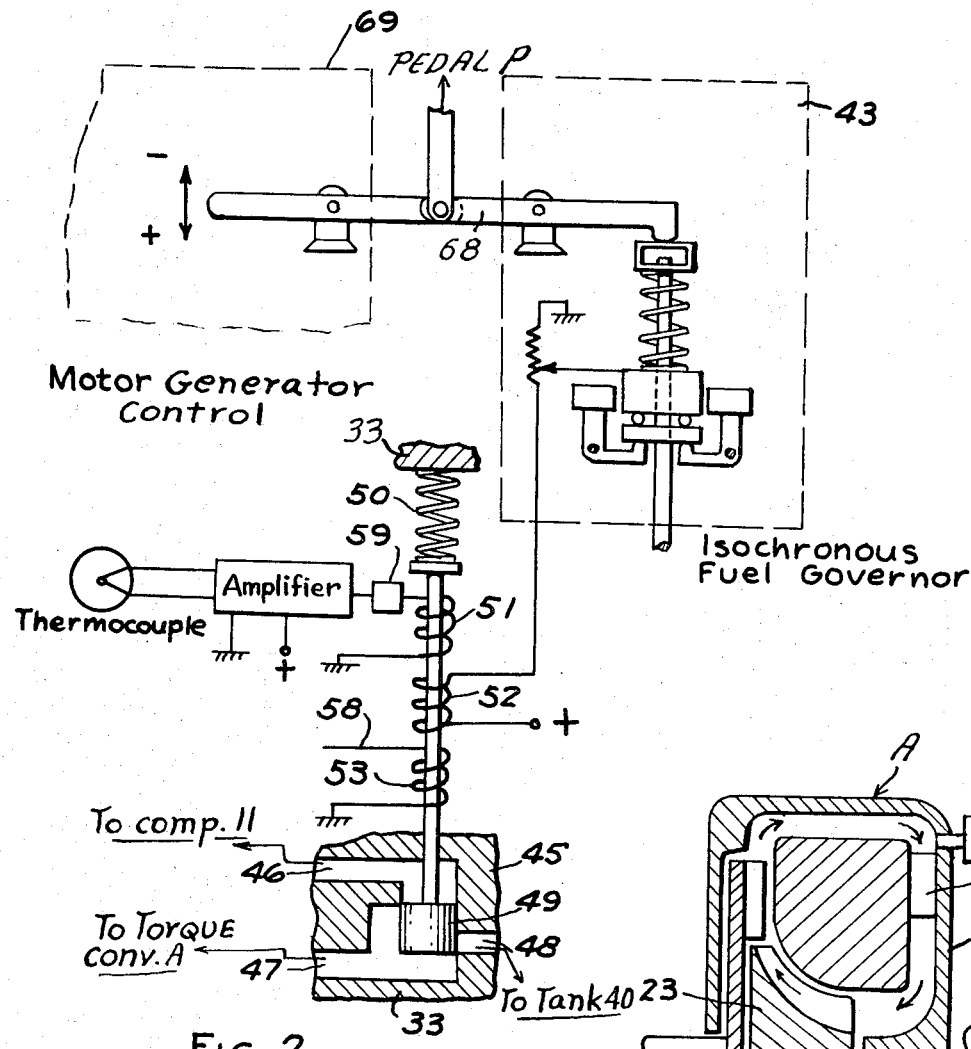
FIG. 2 is a schematic drawing of a control valve utilized in the system shown in FIG. 1.

As previously set forth, the valve 33 is operable to permit flow through the line 30 between the compressor 11 and the casing 21 of the torque converter or to interrupt the flow so that flow can occur between the casing 21 and the vacuum tank 40 through line 37. The valve 33 is shown schematically more in detail in FIG. 2 and comprises a valve body 45 that has a port 46 which is connected to the discharge point of compressor 11 through line 30, and a port 47 which is connected to the torque converter. A port 48 is connected to the vacuum tank 40. A piston 49 is provided between the ports and is shown in FIG. 2 in zero position. Piston 49 is operable downwardly as shown to permit flow between ports 46 and 47. The piston 49 is normally yieldingly urged and held in the downward position by a spring 50 contained within the valve body 45. The piston 49 is moved in response to a temperature signal of the turbine applied by a coil 51 in opposition to the biasing action of the spring 50 to throttle the flow between ports 46 and 47 and, finally, completely interrupt the flow to permit flow between the ports 47 and 48 to thereby dump the fluid from the converter A into the vacuum tank 40. The temperature signal of the turbine can be modified by the first derivative of temperature in respect to time in a first derivative feed back unit 59 connected to coil 51 and including a thermocouple element and amplifier in order to minimize overshooting of the selected turbine gas temperature during rapid temperature excursions. In addition, the piston 49 is moved in response to a signal applied by a coil 52 energized from the governor control 43 which measures the difference between the speed setting of the control 43 and the actual speed of the turbine in opposition to the biasing action of spring 50 to thereby also modulate the fluid flow. An additional force is applied to the piston 49 which is caused by the differential pressure between ports 46 and 47 acting on the opposite sides of piston 49.

Valve 33 is thus responsive to (1) the temperature of the fluid in the turbine T, (2) the pressure differential between the compressor 11 and the casing 21 of the aerodynamic torque converter across ports 46 and 47, and (3) the difference between the speed setting of the governor control 43 and the actual speed of the turbine.

The system as thus far described is identical with the turbine engine and aerodynamic torque converter drive disclosed in more detail in copending application Ser. No. 700,942 filed Jan. 26, 1968 and needs no further explanation. The magnetic field of the stator F of the motor generator G is selectively energized for forward and reverse drive by a two-position switch 61 which is controlled by oppositely disposed solenoids 62 and 63. A hand-operated forward and reverse switch 64 selectively controls the energization of solenoid 62 for forward drive and solenoid 63 for reverse drive. Power for driving the motor generator in the motor mode is received from an energy source 65 such as a battery which, as will be explained is rechargable by the motor generator when driven in the generator mode.

As presently described, the vacuum pump 38 operates to make the aerodynamic torque converter A function as a clutch. Relays 66 and 67 are arranged in the circuit to bring the torque converter A into the declutch position when the forward and reverse switch 64 is in the forward position and the turbine switch 55 is off. The relays 66 and 67 further function to place the torque converter A in the declutch position when the switch 64 is in the neutral or reverse position with the turbine switch 55 on.

Suitable controls are provided to prevent abusing the battery 65 by overcharging. A switch 28, responsive to battery temperature, is provided for disconnecting the battery 65 from the motor generator G in the event of a thermal runaway or overtemperature of the battery. A battery analyzer 71, which is positioned to sense both, current flow in the battery circuit and the voltage across the battery, provides for disconnecting the battery from the motor generator G when the battery charge reaches a predetermined point which can be defined as the most efficient solution density. When either unit 28 or 71 acts to disconnect the battery, a deenergizing relay 72 moves a switch 73 to connect the motor generator G to a resistance 74 which absorbs the energy of regenerative braking and dissipates it as heat. A line 75 signals a control unit 69 of the battery disconnection and the control unit 69 schedule is changed. This prevents the regenerative braking circuit from dissipating power through the resistance 74 while the turbine is running and acting as a propulsion unit.

An important feature of the improved system is, that the motor generator G, when acting as a generator, provides rapid charging of the battery 65, thereby minimizing the time it will be necessary to operate the turbine for recharge of the battery during moderately slow driving. During fast freeway driving the battery 65 is soon fully charged, and on demand the circuit reverts to dynamic resistance braking through resistance 74 and the vehicle performs as a turbine propelled car at high speeds receiving little, if any, of its power from the motor generator G.

OPERATION

The improved driving system is started by closing the ignition switch 76. With the gas turbine engine switch 55 in the off position, the vehicle functions as an electric battery powered vehicle. It can be charged from any available electric utility power while standing still. To drive, the forward-reverse switch 64 is moved to the appropriate position. This pulls in either solenoid 62 or 63. Solenoids 62 and 63 position switch 61 to energize the motor generator field coils for either forward or reverse operation. The speed and acceleration is adjusted with the foot pedal P which positions a control lever 68 to convert and transmit the mechanical input signal to the motor generator control unit 69. Unit 77 controls the current flow to the motor generator G and the current in the stator field.

In order to start the turbine, the control 64 is moved to its neutral position, the operator moves the turbine on-off control 55 to the "on" position which actuates the sequencing control 44 to energize a starting motor 54 to in turn start the turbine in accordance with well known practice. Simultaneously, in this position of the on-off control 55, the vacuum pump 38 is energized and the coil 53 (FIG. 2) is immediately energized to operate the valve 33 to that position at which communication is provided between the ports 47 and 48. This permits the vacuum pump 38 to evacuate the casing 21 of the torque converter while the check valve 32 prevents flow into the torque converter. Under this condition, the valve 35 permits flow only to such extent as to sufficiently cool the casing. In this mode of operation, the torque converter is acting as a clutch with very little power being transmitted. The energy losses are very small and the flow through valve 35 is minimal.

In any position of the fuel control, that is, pedal P, fuel will be fed through the line 57 to the combustor 16 of the gas turbine. In order to transmit torque, the forward-reverse switch 64 is moved to the forward position whereby the vacuum pump 38 is made inoperative. Valve 33 now provides communication between the ports 46 and 47 and the density of fluid in the aerodynamic torque converter A attains its maximum value. The manual governor control 43 can then be moved to any desired speed position. As the temperature of the turbine rises and achieves a predetermined value, a signal will be provided by the unit 59 moving the piston 49 of the valve 33 to throttle or modulate flow between the ports 46 and 47 from the compressor 11 to the casing 21 of the torque converter. As the temperature further rises, the piston 49 will completely interrupt the flow and finally permit flow from the casing 21 of the torque converter outwardly to the vacuum tank 40.

As the piston 49 moves upwardly closing the flow path between the ports 46 and 47, the pressure differential on the piston is only that which is throttling effect but as the piston moves to reduce the pressure in the casing 21 to the required level, a pressure differential will exist across ports 46 and 47 so that the valve 33 will be sensitive to the pressure within the casing 21 as it is opening communication between the ports 47 and 48.

Since the valve 33 is pressure sensitive, it will respond to the pressure condition of the casing 21 of the aerodynamic torque converter and thereby produce a pressure within the torque converter proportionate to the signal it is receiving. More effective and accurate control of the system is made possible by the sensitivity of the valve 33 to pressure within the torque converter.

As further shown in the drawings, the action of the valve piston 49 of the valve 33 is further modulated by a signal from the governor control 43 which is produced by monitoring the difference between the setting of the governor control 43 and the actual speed of the turbine. In the case of acceleration, an error signal will exist that tends to move the valve piston 49 upwardly against the action of the spring 50 throttling flow between the compressor and the casing of the aerodynamic torque converter. In the case of deceleration, the error signal is in the opposite direction causing the valve piston 49 to move downwardly thereby increasing the output load on the turbine. If the magnitude of the signal is sufficient, the valve piston may move to a point where flow will be permitted from the casing 21 to the vacuum tank 40.

When the valve piston 49 has moved to a position permitting flow from the casing to the vacuum tank and a new pressure differential is established, the valve piston will be urged by the spring downwardly, as viewed in FIG. 2, to interrupt the flow from the casing to the vacuum tank. At this point in the operation, there will be no flow into the casing and, as the temperature of the fluid in the casing rises, the pressure will also rise causing the valve piston to throttle between ports 47 and 48 and maintain the pressure differential. At this point, the input torque capacity of the aerodynamic torque converter is slowly being reduced because of the lowering of fluid density within the converter, which in turn is caused by raising the temperature of the air at essentially constant pressure. As the temperature rise is a slow phenomena, there is time now for sensing the loss in capacity of the torque converter from the turbine 12 temperature and valve 33 will be signalled for a continuing higher pressure until the torque converter pressure is sufficient to permit flow in line 31 past check valve 32 to the turbine.

In all conditions of the system, if the temperature in the casing as sensed by the sensor 36 exceeds a predetermined value, the valve 35 is operable to permit flow from the compressor 11 to the casing 21 to protect the materials of the torque converter. This is also a slow phenomena permitting time for the cooling effect upon the density of the air within the torque converter A and the associated increase in capacity of the converter to be sensed from the temperature of the turbine and compensated for by valve 33.

Figure 4:
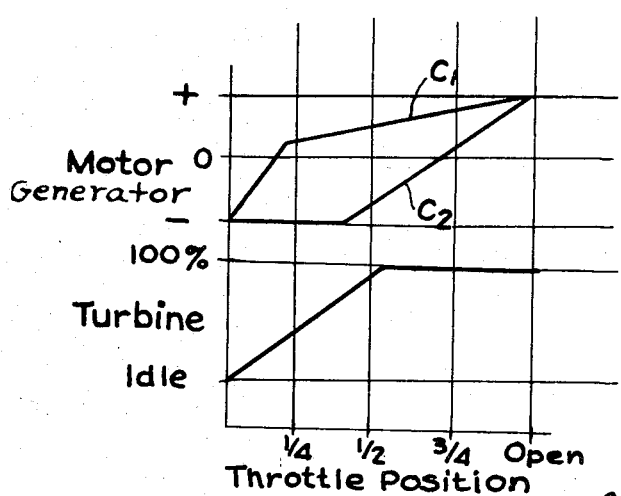
FIG. 4 is a schematic diagram showing the throttle position relative to the motor generator control and turbine speed control.

FIG. 4 is a schematic diagram using rectangular cartesian coordinates showing the throttle position relation to the motor generator control and turbine speed control. On the ordinate the motor generator propulsion is shown as positive (+) and the motor acting as a generator is shown as negative (−). Schedule $C_1$ is used when the generated electrical energy is being dissipated through resistance 74 by the relative position of switch 73. Schedule $C_2$ provides for charging the battery when the turbine is operative. This arrangement of schedules provides for charging the battery with the turbine operative and avoids dissipating the turbine energy in the form of regenerative braking through the resistance 74 when the battery is not being charged. The complications of sequencing type controls have been avoided by this selection of throttle scheduling.

I claim:

1. The combination comprising:
   a vehicle having at least one driven ground engaging wheel;
   a gas turbine engine having a combustor, a compressor and a turbine member, said compressor and turbine member each having a rotor and a stator;
   a torque converter;
   said torque converter having a casing filled with a compressible fluid, a stator, an input rotor, and an output rotor which is driven by fluid action upon rotation of said input rotor;
   a first fluid line between the compressor of said turbine engine and said torque converter to variably fill said casing with fluid from said compressor;
   a second fluid line between the combustor of said turbine engine and said torque converter to enable fluid to flow from said casing to said combustor;
   said input rotor of said torque converter being connected to and driven by said rotor of said compressor and said turbine member and said rotor of said torque converter being driven by fluid action upon rotation of said input rotor to deliver torque relative to the density of the fluid in said casing;
   valve means in said first fluid line operable in one position to permit flow through said first fluid line and operable in another position to permit flow from said casing of said torque converter out of said valve means;
   said valve means being responsive to the temperature of said turbine engine such that as the temperature of the turbine engine increases beyond a certain point, the valve initially throttles the flow between said compressor and said casing and thereafter interrupts the flow and diverts fluid from said casing out of said valve means;
   a motor generator including a stator and a rotor connected to a source of electrical storage energy;
   said rotor of said motor generator being connected to the output rotor of said torque converter;
   said rotor of said motor generator being also connected to the driven wheel of the vehicle; and
   means responsive to conditions of said energy source to automatically disconnect the latter from said motor generator.

2. The combination set forth in claim 1 including means for electrically connecting said energy source and said motor generator for operating said motor generator as a motor, and means for deenergizing said last-mentioned means causing actuation of said turbine engine to reverse the operation of the motor generator so that it operates as a generator to supply current to said energy source.

3. The combination set forth in claim 1 including a differential interposed between said aerodynamic torque converter and said driven wheel.

4. The combination set forth in claim 1 wherein said valve means is responsive to the pressure differential between the compressor and the casing of the torque converter.

5. The combination set forth in claim 1 wherein said valve is normally biased by spring means in a direction to permit flow between said compressor and said casing, said means responsive to said temperature of said turbine engine opposing said biasing action.

6. The combination set forth in claim 1 including a third fluid line extending between said compressor and said casing of said torque converter, valve means in said third fluid line, said last-mentioned valve means being responsive to the temperature of said torque converter to permit flow between said compressor and said torque converter when the temperature of said converter exceeds a predetermined value.

7. The combination set forth in claim 1 including means for varying the fuel supply to said turbine engine, and means responsive to the difference between the setting of the last-mentioned means and the speed of said turbine engine to modulate the first-mentioned valve means and cause said valve means to throttle or interrupt the flow between said compressor and said aerodynamic torque converter in proportion to the difference between the setting of the desired speed and the actual speed of the turbine.

8. The combination set forth in claim 1 wherein a vacuum tank is connected to said first-mentioned valve means to which fluid from said aerodynamic torque converter is diverted by said valve means in one position of said valve means.

9. The combination set forth in claim 8 including a line extending from said first line, a venturi connected to said last-mentioned line and said vacuum tank and operable thereby to evacuate said tank.

10. The combination set forth in claim 1 including a vacuum pump connected to said first-mentioned valve means and means operable when said vacuum pump is energized to position said valve means such that fluid flow is permitted between said casing of said torque converter and said vacuum pump.

11. The combination set forth in claim 1 including a check valve in said second line operable to permit flow in one direction only from said casing of said torque converter to said turbine.

12. The combination comprising:
   a vehicle having at least one driven ground engaging wheel;
   a gas turbine engine having a combustor, a compressor and a turbine wheel, said compressor and turbine member each having a rotor and a stator;
   said compressor having a fluid outlet and said combustor having a fluid inlet;
   a torque converter;

said torque converter having a casing filled with a compressible fluid, a stator, an input rotor, and an output rotor which is driven by fluid action upon rotation of said input rotor;

a first fluid line between the outlet of said compressor of said turbine engine and a pressure area of said casing of said torque converter to fill said casing with fluid from said compressor;

a second fluid line between the inlet to said combustor of said gas turbine engine and said casing of said torque converter to enable fluid to flow from said casing to said combustor;

said input rotor of said torque converter being connected to and driven by said rotor of said compressor and said turbine member;

a motor generator including a stator and a rotor connected to a source of electrical storage energy;

said rotor of said motor generator being connected to the output rotor of said torque converter;

said rotor of said motor generator being also connected to the driven wheel of the vehicle;

first means responsive to temperature within said energy source to automatically disconnect the latter from said motor generator; and second means responsive to current flow and density within said energy source to automatically disconnect the latter from said motor generator independent of said first means.

13. The combination set forth in claim 12 including means for electrically connecting said energy source and said motor generator for operating said motor generator as a motor, and means for deenergizing said last-mentioned means causing actuation of said turbine engine to reverse the operation of the motor generator so that it operates as a generator to supply current to said energy source.

14. The combination set forth in claim 12 including a differential interposed between said aerodynamic torque converter and said driven wheel.

15. The combination set forth in claim 12 including:

valve means in said first fluid line operable in one position to permit flow through said first fluid line and operable in another position to permit flow from said casing of said torque converter out of said valve means;

said valve means being responsive to the temperature of said turbine engine such that as the temperature of the turbine engine increases beyond a certain point, the valve initially throttles the flow between said compressor and said casing and thereafter interrupts the flow and diverts fluid from said casing out of said valve means; and said valve being also responsive to the pressure differential between the compressor and the casing of the aerodynamic torque converter such that the valve initially throttles the flow between said compressor and said casing and thereafter interrupts the flow and diverts fluid from said casing out of said valve means.

16. The combination set forth in claim 15 wherein said valve is normally biased by spring means in a direction to permit flow between said compressors and said casing, said means responsive to said temperature of said turbine engine opposing said biasing action.

17. The combination set forth in claim 15 including a third fluid line extending between said compressor and said casing of said torque converter, valve means in said third fluid line, said last-mentioned valve means being responsive to the temperature of said torque converter to permit flow between said compressor and said torque converter when the temperature of said converter exceeds a predetermined value.

18. The combination set forth in claim 15 including means for varying the fuel supply to said turbine engine, and means responsive to the difference between the setting of the last-mentioned means and the speed of said turbine engine to modulate the first-mentioned valve means and cause said valve means to throttle or interrupt the flow between said compressor and said aerodynamic torque converter in proportion to the difference between the setting of the desired speed and the actual speed of the turbine engine.

19. The combination set forth in claim 15 wherein a vacuum tank is connected to said first-mentioned valve means to which fluid from said aerodynamic torque is diverted by said valve means in one position of said valve means.

20. The combination set forth in claim 19 including a line extending from said first line, a venturi connected to said last-mentioned line and said vacuum tank and operable thereby to evacuate said tank.

21. The combination set forth in claim 15 including a vacuum pump connected to said first-mentioned valve means and means operable when said vacuum pump is energized to position said valve means such that fluid flow is permitted between said casing of said torque converter and said vacuum pump.

22. The combination set forth in claim 15 including a check valve in said second line operable to permit flow in one direction only from said casing of said torque converter to said turbine.

23. The combination comprising:

a vehicle having at least one driven wheel;

a gas turbine engine having a combustor, a turbine and a compressor, said turbine and said compressor each having a rotor and a stator;

said compressor having a fluid outlet and said combustor having a fluid inlet;

a torque converter;

said torque converter having a casing filled with a compressible fluid, a stator, an input rotor and an output rotor which is driven by fluid action upon rotation of said input rotor;

said input rotor of said torque converter being connected to and driven by said rotor of said turbine engine compressor;

a first fluid line between the outlet of said compressor of said turbine engine and a pressure area of said casing of said torque converter to fill said casing with fluid from said compressor;

a second fluid line between the inlet to said combustor of said gas turbine engine and said casing of said torque converter to cause fluid flow from said casing to said turbine engine;

valve means in said first fluid line operable in one position to permit flow through said first fluid line and operable in another position to permit flow from said casing of said torque converter out of said valve means;

means yieldingly urging said valve in a direction to permit flow through said first fluid line;

means responsive to the temperature of said turbine engine for moving said valve such that as the temperature of the turbine engine increases beyond a certain point, the valve initially throttles the flow between said compressor and said casing and thereafter interrupts the flow and diverts fluid from said casing out of said valve means;

means responsive to the pressure differential between the compressor and the casing of the torque converter to move the valve in a direction such that as the temperature differential increases beyond a certain point, the valve initially throttles the flow between the compressor and casing and thereafter interrupts the flow and diverts the flow from said casing out of said valve means;

a motor generator including a rotor and a stator connected to a source of electrical storage energy;

said rotor of said motor generator being connected to the output rotor of said torque converter;

said rotor of said motor generator being also connected to the driven wheel of the vehicle; and means responsive to heat and density conditions within said source of energy to automatically disconnect the latter from said motor generator.

24. The combination set forth in claim 23 including a third fluid line extending between said compressor and said casing of said torque converter, valve means in said third fluid line, said last-mentioned valve means being responsive to the temperature of said torque converter to permit flow between said compressor and said torque converter when the temperature of said converter exceeds a predetermined value.

25. The combination set forth in claim 23 including means for varying the fuel supply to said turbine engine, and means responsive to the difference between the setting of the last-mentioned means and the speed of said turbine engine to modulate the first-mentioned valve means and cause said valve means to throttle or interrupt the flow between said compressor and said aerodynamic torque converter in proportion to the difference between the setting of the desired speed and the actual speed of the turbine engine.

26. The combination set forth in claim 23 wherein a vacuum tank is connected to said first-mentioned valve means to which fluid from said aerodynamic torque converter is diverted by said valve means in one position of said valve means.

27. The combination set forth in claim 23 including a line extending from said first line, a venturi connected to said last-mentioned line and said vacuum tank and operable thereby to evacuate said tank.

28. The combination set forth in claim 23 including a vacuum pump connected to said first-mentioned valve means and means operable when said vacuum pump is energized to position said valve means such that fluid flow is permitted between said casing of said torque converter and said vacuum pump.

29. The combination set forth in claim 23 including a check valve in said second line operable to permit flow in one direction only from said casing of said torque converter to said turbine.

30. A drive system for a vehicle having at least one driven wheel, comprising:
  a prime mover having an output drive shaft;
  a motor generator connected to a source of electrical storage energy and having a rotor drivingly connected to said driven wheel;
  a variable speed fluid coupling means having an input connected to said output drive shaft of said prime mover and having an output connected to said rotor of said motor generator to thereby selectively drive said motor generator and said driven wheel when said motor generator acts as a generator or be driven by said motor generator when said motor generator acts as a motor to drive said wheels; and
  means responsive to torque load conditions of said vehicle to automatically vary the power output of said prime mover and said motor generator such that said motor generator functions as a motor at relatively low driving speed and high torque conditions and functions as a generator at relatively higher speed and lower torque conditions to rapidly recharge said source of electrical storage energy to a predetermined solution density and thereafter automatically disconnect said motor generator from said source of electrical storage energy.

31. In the drive system as defined in claim 31, said prime mover comprising a gas turbine engine having a combustor, a turbine member and a compressor having a rotor driven by said turbine member, said output drive shaft being driven by the rotor of said compressor, and said variable speed fluid coupling means comprising an aerodynamic torque converter having a fluid chamber in fluid communication with said gas turbine engine, the output of said aerodynamic torque converter comprising a rotor driven by said fluid from said gas turbine engine and drivingly connected to said rotor of said motor generator, valve means responsive to heat and pressure conditions within said gas turbine engine and said aerodynamic torque converter to selectively vary the fluid pressure and density within the fluid chamber of said aerodynamic torque converter to cause said torque converter to transmit driving torque only when said gas turbine engine is operating under relatively peak performance condition and to declutch said torque converter from said gas turbine engine when the gas turbine engine is operating under relatively low performance conditions to thereby permit said motor generator to drive said vehicle in a motor mode; and a motor generator control device for controlling operation of said motor generator connected to said valve means.

32. In the drive system as defined in claim 31, said means responsive to torque load conditions of said vehicle to automatically vary the power output of said prime mover and said motor generator comprising a fuel control device for control of fuel supply to said gas turbine engine and said motor generator control device for controlling operations of said motor generator, both of said control devices being connected to an accelerator pedal of said vehicle and operable to additionally control said heat and pressure responsive valve means such that upon acceleration an error signal will be produced causing throttling of fluid flow between said compressor and said aerodynamic torque converter, and upon deceleration an error signal in the opposite direction will be produced causing an increase in fluid flow between said compressor and said aerodynamic torque converter to thereby increase the output load on said gas turbine engine.

33. In the drive system as defined in claim 32, said error signal produced by said control devices being intermittently sufficient under certain temperature and fluid pressure conditions in said aerodynamic torque converter to declutch said torque converter and permit said motor generator to operate in the motor mode to drive said vehicle.

34. In combination with a vehicle having at least one driven wheel:
  a motor generator selectively variably connected with a source of electrical storage energy and having rotor means drivingly connected with said driven wheel;
  a gas turbine engine having output means selectively variably drivingly connected with said motor generator rotor means; and
  control means effecting automatic wheel-driving power sharing between the motor generator and the gas turbine engine and being responsive to torque load conditions of said vehicle whereby said vehicle is driven solely or primarily by said motor generator at relatively lower speeds or for fast-response acceleration, and is driven solely or primarily by said gas turbine engine at relatively higher speeds or during relatively constant speed operation.

35. The combination as defined in claim 34 and including means automatically selectively connecting and disconnecting said motor generator from said energy source.

36. The combination as defined in claim 34 and including means automatically selectively connecting and disconnecting said gas turbine engine from said motor generator rotor means.

UNITED STATES PATENT OFFICE
CERTIFICATE OF CORRECTION

Patent No. 3,543,873     Dated December 1, 1970

Inventor(s) William W. Toy     (TWW-102-)

It is certified that error appears in the above-identified patent and that said Letters Patent are hereby corrected as shown below:

In the Spec.

Column 2, line 39, after "is" insert --operable at--

", line 61, after "converter" insert --A--.

Column 4, line 48, after "which is" insert --due to the---

In the Claims

Column 9, line 61, change "claim 31" to --claim 30--

SIGNED AND
SEALED
MAR 9 1971

(SEAL)
Attest:

Edward M. Fletcher, Jr.
Attesting Officer

WILLIAM E. SCHUYLER, JR.
Commissioner of Patents